(12) United States Patent
Butler (10) Patent No.: US 9,944,120 B1
(45) Date of Patent: Apr. 17, 2018

(54) DEBRIS SHIELD FOR CASTER WHEELS

(71) Applicant: Jacqueline Butler, La Mesa, CA (US)

(72) Inventor: Jacqueline Butler, La Mesa, CA (US)

( * ) Notice: Subject to any disclaimer, the term of this patent is extended or adjusted under 35 U.S.C. 154(b) by 0 days.

(21) Appl. No.: 15/480,082

(22) Filed: Apr. 5, 2017

(51) Int. Cl.
*B60B 33/00* (2006.01)

(52) U.S. Cl.
CPC ........ *B60B 33/00* (2013.01); *B60B 2900/212* (2013.01); *B60B 2900/551* (2013.01)

(58) Field of Classification Search
CPC ... Y10T 16/207; Y10T 16/216; Y10T 16/184; B60B 33/00; B60B 33/0002; B60B 33/006; B60B 7/00; B60B 7/06; B60B 7/061; B60B 2900/212; B60B 2900/551; A47B 91/00; A47B 91/12; A47B 95/043; A47B 2095/046; A47C 19/024
See application file for complete search history.

(56) References Cited

U.S. PATENT DOCUMENTS

| | | | | |
|---|---|---|---|---|
| 2,046,384 A * | 7/1936 | Katcher | ........... | B60B 33/00 15/159.1 |
| 2,450,062 A * | 9/1948 | Voss | ........... | A47L 9/009 16/18 CG |
| 2,471,958 A * | 5/1949 | Humphreys | ........... | B60B 33/00 16/18 CG |
| 3,601,345 A * | 8/1971 | Johnson | ........... | F16F 1/371 248/188.9 |
| 3,643,905 A * | 2/1972 | Kint | ........... | A47C 7/004 248/345.1 |
| 4,323,610 A * | 4/1982 | Leverich | ........... | A47B 95/043 428/100 |
| 5,271,920 A * | 12/1993 | Chang | ........... | B01J 20/186 423/700 |
| 5,615,450 A * | 4/1997 | Butler | ........... | B60B 33/00 16/18 CG |
| 6,125,504 A * | 10/2000 | Richards | ........... | B60B 33/00 16/18 CG |
| 8,484,801 B2 * | 7/2013 | Li | ........... | B60B 7/02 16/18 CG |
| 8,869,733 B2 * | 10/2014 | Parnell | ........... | B66C 23/78 116/28 A |
| 9,108,462 B1 * | 8/2015 | Stone | ........... | B60B 33/0023 |
| 2015/0328926 A1 * | 11/2015 | Illing | ........... | B60B 33/00 16/18 CG |

FOREIGN PATENT DOCUMENTS

| | | | | |
|---|---|---|---|---|
| DE | 2839344 A1 * | 3/1980 | ............. | B60B 33/00 |
| JP | 58071203 A * | 4/1983 | ............. | B60B 33/04 |

* cited by examiner

*Primary Examiner* — Chuck Mah
(74) *Attorney, Agent, or Firm* — Donn K. Harms (57) ABSTRACT

A debris shield for engagement to a caster wheel is provided. The debris shield surrounds an opening in which a well of a caster wheel assembly is positioned. A flexible shield extending from the perimeter edge of the body and having a complimentary shape thereto, sweeps debris out of the path of the wheel rolling on a surface. Front and rear ends of the body are preferably pointed to provide angled portions of the debris shield of the flexible shield. Bristles of the shield may be reinforced by flexible adhesive and or mesh. An optional guard which is engageable to cover the shield around the projection points may be added.

15 Claims, 7 Drawing Sheets

DEBRIS SHIELD FOR CASTER WHEELS

BACKGROUND OF THE INVENTION

1. Field of the Invention

The present invention relates generally to support wheels such as casters. More particularly, it relates to a device and method which is engageable to caster wheel assemblies which provides a surrounding shielding of the caster wheels rolling on a support surface from debris thereon which can inhibit such rolling, damage wheels, damage product, prevent tipping or possible operator injury.

2. Prior Art

Modernly, many portable structures and devices have been provided with wheels to allow for easy movement and relocation when needed. Devices such as shopping carts, tool chests, creepers, furniture dollies, chairs, tables and various other types of machinery and material handling equipment are supported by wheeled casters which provide for movement of such devices. Frequently employed for such wheeled support are caster wheels which feature wheels rolling upon an axle substantially perpendicular to the support surface. The axle for the wheel of such casters on such casters is itself frequently engaged in a rotating mount with the component or furniture it supports. Such wheeled support provides very easy multidirectional movement and relocation of the supported items, especially if heavy or bulky. Both wheeled movement of the supported component and steering during such movement is enabled through the use of caster wheels.

However, when such a supported component or device is employed in a work environment, there are many hazards and other problems that arise when moving it upon rolling caster wheels. The supporting surface on which the caster wheels roll, such as a shop floor, is frequently covered with dirt, rocks, metal fragments, chips, and similar debris which can accumulate in most manufacturing and high traffic environments. Such particulate material, be it small or large, can significantly inhibit the ability of the caster wheels to roll on the surface. Further, many types of such particulate material can cause damage to the wheels themselves. Still further, dust and grit and other small particles can cause damage to the wheel or bearing contacting the axle on which the wheel rotates.

There can be minor and serious consequences where casters supporting a device or structure encounter such particulate material on the support surface on which the wheels of the caster are rolling. One annoying consequence is for the user pushing the device on the casters where they encounter material in the path of their rolling which is of sufficient size to act as a block to stop wheel rolling. Such requires the user to pull the cart or device supported by the casters momentarily in reverse and then push in a slightly different forward direction to circumvent the wheel-blocking material on the floor.

Where the casters support a chair, cart, or the like with a high center of gravity, caster wheels encountering particulate or other material during rolling upon the support surface can be caused to stop rolling too quickly. Such can cause a supported cart or device to tip over and cause injury and/or equipment damage.

In many factory and retail environments where casters are employed for rolling support of equipment, goods for sale, or personnel, the accumulation of such particulate material can be successive over a duration of a shift or day. This increase in material causes an ever increasing risk of tipping over, wheel damage, product damage, injury, and user-annoyance due to stopping of caster rollers requiring the noted reverse and forward redirection.

Prior art has taught numerous devices in attempts to solve these multiple problems with the use of wheeled casters in commercial and manufacturing environments. In general, devices in the prior art has taught the use of annular ring-like shields, or rectangular shaped shields which are positioned to surround the wheel of the caster. However, in many environments the arched or planar shield positioned to the front or rear of caster wheels being protected, has shown to be inadequate to protect caster wheels from many types of particulate material which the shields encounter during wheel rolling. This is especially true where the wheels encounter larger bits of material or heavy material such as metal shavings or pieces.

This is particularly true where the shield or protective device for the caster wheel is protecting a larger diameter wheel such as caster wheels exceeding four inches in diameter which are used for rolling support of heavier loads such as machinery or components. While circular or annular caster shields and brushes work well on small wheels and small wheels that turn, since they continually surround the wheel and can be fixed in position, an annular or circular shaped wheel shield does not work well for casters with larger wheels, especially if they move to steer or rotate. This is because as the radius of the shield required to shield both the front and rear of a larger caster wheel, especially where it steers, causes the protective shield to project much to far from the wheel on opposing sides. This can trip workers and cause the device to bump into machinery or furniture unintentionally.

In such instances where casters have larger wheels for easier rolling of heavier loads, substantially rectangular wheel shielding devices have been taught to protect the wheels. However, in solving the issue of positioning the wheel shield closer to the side surfaces of the wheel, the taught rectangular devices employ front and rear wheel shield portions which are linear and run substantially parallel to the axle of the wheel. Such short linear shields do not work well to deflect and push particulate out of the path of the wheel since they contact the material at a perpendicular angle which simply pushes the material to ever-higher piles directly in front of the path of the wheel of the caster. Further, when the wheels being shielded rotate to steer a supported device, the rectangular front portions have been found to miss or jump over particulate and the like when rotating in front of the rolling wheel.

Still further, the flexible material taught for employment on prior art caster wheel shields, such as brush bristles or similar material, does not always work well to dislodge or move heavier particulate material in the path of the rolling caster wheel. For example, metal pieces or components are much heavier than dust, plastic and the like, and when they encounter the flexible wheel shields of prior art, they can bend the individual bristles encountering the heavier particulate for fragments to the point where the skirt simply jumps over them. When this occurs, the material which has breached the bristles or other flexible material of the shield for the wheel, will easily lodge in front of the rolling wheel which, as noted, can damage it, cause a tipping or damage of the supported load, or result in operator injury.

As such, there exists a continuing unmet need for an improved caster wheel debris shield, which is configured to work well with both smaller diameter wheels as well as larger diameter wheels used for rolling support of heavier loads. Such a device should employ a shape for the shield or skirt surrounding the wheel which maintains a close proximity to both the front and rear of the wheel, and both side surfaces thereof. Such a shape for the wheel-surrounding shield should be configured to deflect encountered particulate and such in a direction out of the path of the oncoming caster wheel. Such deflection should occur where the wheel and flexible shield are running straight, and during turns of the wheel and protective flexible shield. Further, such a device should provide for a flexible wheel-surrounding shield, which will sweep fine and smaller material out of the path of the caster wheel and also prevent heavier and larger pieces of particulate material from breaching the perimeter of the shield during use.

The forgoing examples of related art as to caster wheel shields and protective devices and limitations related therewith are intended to be illustrative and not exclusive, and they do not imply any limitations on the invention described and claimed herein. Various limitations of the related art will become apparent to those skilled in the art upon a reading and understanding of the specification below and the accompanying drawings.

SUMMARY OF THE INVENTION

The device herein disclosed and described provides a solution to noted and other shortcomings in prior art with regard to flexible debris shields for rolling wheels of casters. The device features a body having a connector adapted to engage the body to a caster in an operative engagement where a perimeter formed by the body surrounds a wheel of the caster, and the distal ends of a flexible shield, projecting from the body, contact the support surface of the wheel. The flexible shield is engaged to the body, preferably in a removable engagement allowing replacement.

Preferably, the perimeter of the body is formed with angled projecting portions positioned in front of and to the rear of the wheel when the device is operatively engaged thereto. This positions the projecting flexible shield at opposing angles relative to the plane of the wheel, to an intersection point of the angled portions at a point which is always aligned with the pathway followed by the wheel during rolling on the support surface.

In a preferred mode of the device, the flexible shield projecting from the angled portions of each projecting portion can be formed of bristles which may be reinforced using an adhesive to adhere portions of adjacent bristles to each other. This reinforcement may be enhanced by inclusion of a planar flexible mesh in-between the bristles and which is adhered in place by an adhesive such as silicone adhesive.

The device includes a connector to operatively engage the body to a caster with the perimeter of the body and the flexible shield projecting therefrom, surrounding the wheel. The connector may have a means to adjust a height of the body and thus the distal ends of the flexible shield, from or against the support surface. Preferably, the connector will engage with the caster or axle thereof, and be positioned on the body of the device, to center an intersection point of the two angled portions at the front and rear of the device, at a point aligned with the axis of the wheel to insure that the center convergence point of both angled portions is always positioned along the rolling path of the wheel whether it runs straight or turns.

With respect to the above description, before explaining at least one preferred embodiment of the herein disclosed caster wheel flexible shield invention in detail, it is to be understood that the caster wheel protecting invention herein is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing other structures, methods and systems for carrying out the several purposes of the present disclosed connector system and method. It is important, therefore, that the claims be regarded as including such equivalent construction and methodology insofar as they do not depart from the spirit and scope of the present invention.

The objects, features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing limitations thereon.

BRIEF DESCRIPTION OF DRAWING FIGURES

The accompanying drawings, which are incorporated herein and form a part of the specification, illustrate some, but not the only or exclusive, examples of embodiments and/or features of the disclosed device herein. It is intended that the embodiments and figures disclosed herein are to be considered illustrative rather than limiting. In the drawings.

Shown in FIG. 8 is an optional guard which is engageable to the cover the flexible shield around the projection point and extending in front of the flexible shield along both angled portions to prevent the toes of users or workers from reaching the wheel during rolling of the caster.

Other aspects of the present invention defining the flexible shield for wheels of casters shall be more readily understood when considered in conjunction with the accompanying drawings, and the following detailed description, neither of which should be considered limiting.

DETAILED DESCRIPTION OF THE PREFERRED EMBODIMENTS OF THE INVENTION

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation.

Figure 1:
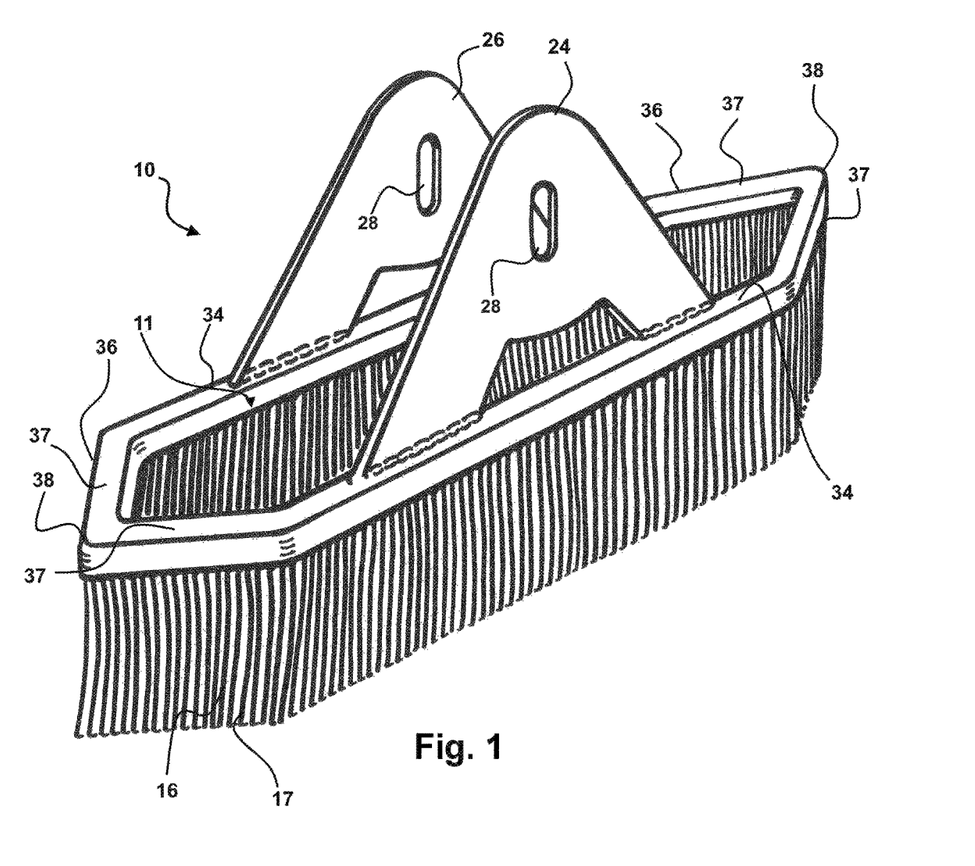
FIG. 1 depicts an overhead perspective view of a preferred mode of the device showing a connector formed by a pair of mounting brackets extending above the body of the device which has pointed front and rear ends having an intersection point of angled side portions positioned in line with the path of a caster wheel.

Now referring to drawings in FIGS. 1-8, wherein similar components are identified by like reference numerals, there can be seen in FIG. 1 a perspective view of a preferred embodiment of the device 10. As shown, a body 12 of the device 10 is configured of an elongated angular member, to form an enclosed perimeter of the body 12 surrounding an opening 11 which is adapted for positioning of caster wheel 14 therein. In a preferred mode the perimeter edge is formed as an irregular hexagon, having four sides in equal length opposing pairs of side portions of equal length. The body 12 is operatively engaged with a caster wheel assembly using a connector 13 extending above a first side of the body 12 to an engaged position such as in FIG. 2.

It should be noted the body 12 can be formed with only four sides, where two angled portions and two parallel side portions protect the wheel in the direction it rolls, and the rear side is open, employing the angled leading portions and parallel sides would still yield better utility than existing round and rectangular encircling caster shield devices. However, such function is enhanced by surrounding the wheel of choice with angled portions interceding both in front and to the rear of the wheel to which it engages to allow debris shielding in both the forward and rearward direction of roll.

As shown in all modes of the device 10, a flexible shield 16 extends below a second or bottom side of the body 12 opposite the first side. The flexible shield 16 is formed of flexible material such as the depicted bristles 17 formed of natural or synthetic material as in FIGS. 1-3.

The connector 13 is provided in a configuration to operatively engage the body 12 to a caster assembly in a manner which positions the wheel 14 of the caster assembly within the opening 11, whereby the body 12 will surround the wheel 14 of a caster assembly supporting an object. By caster assembly is meant a caster having a wheel 14 engaged to an axle which is engaged to run straight, or swivel in an engagement to a supported object. The connector should be configured to position the body 12 of the device 10 in an engaged position with the caster, where it is elevated above a support surface 20 on which the wheel 14 rolls, a distance therefrom such that positions distal ends of the material or bristles forming the flexible shield 16, in a contact with the support surface 20 during a rolling of the wheel 14 thereon.

As shown in FIG. 1, a first end of the flexible shield 16 is engaged to extend below the body 12 such that distal ends thereof contact the support surface 20 for the rolling of the wheel 14. In a preferred mode, first ends of the flexible shield 16 are removably engaged to the body 12 so the flexible shield 16 is replaceable. One manner of such engagement, which should in no way be limiting, is a positioning of the first end of the flexible shield 16, in a gap formed between opposing walls 22 of the body 12. The two walls 22 extend from or below the second or bottom side of the body 12, and form a U-shaped cavity in-between the walls 22, adapted for engagement of the first end of the flexible shield 16 therein.

Such may be a removable engagement using friction or other means of removable engagement such that the first end of the flexible shield 16 formed of flexible material, will engage and disengage from the body 12 with distal ends projecting to contact the support surface 20. Other removable connections of the flexible shield 16 to operatively engage to the body 12 positioning distal ends thereof in contact with the support surface 20 may be used, so long as the body 12 is operatively engaged to the caster assembly to position the wheel 14 in the opening 11 and thereby surround the caster wheel 14, with the flexible shield 16 in the as-used position shown in FIG. 2. So engaged, the flexible shield 16 should be positioned that the distal end of the flexible material or bristles forming the flexible shield 16, contact the rolling surface for the wheel 14.

Currently, a mating connector 13 to engage the body 12 to a caster is provided by a first mounting bracket 24 extending from a first end thereof which is connected to the body 12 to a distal end of the bracket 24. A second mounting bracket 26 is also connected to the body 12 at a first end and extending to a distal end thereof. Apertures 28 communicate through each of the first mounting bracket 24 and second mounting bracket 26. These apertures 28 are sized for passage of an axle or bolt 30 therethrough to thereby hold the body 12 in an as-used position shown in FIG. 2, surrounding the wheel 14 positioned in the opening 11, and with the distal end of the flexible shield 16 in contact with the support surface 20.

Other forms of a mating connector 13 as would occur to those skilled in the art to engage the body 12 of the device 10 to the as-used position may be employed, however for casters with larger diameter wheels 14, experimentation has shown the use of mounting brackets 24 and 26 with apertures 28 sized for engagement of the bolt 30, which also serves as an axle for the wheel 14, works well. Such an engagement has shown be durable to hold the body 12 in the as-used position with the wheel 14 within the opening 11, during straight travel of the wheel 14 on the surface, and when the wheel 14 is swivelled on a turning axle 32 in its engagement supporting an object 18.

Particularly preferred in all modes of the device 10 is the formation of the perimeter of the body 12, surrounding an opening 11, such that the body 12 has two side members 34 which run substantially perpendicular to the axis of the wheel 14 and therefor substantially parallel to each other and a plane running through the circumference of the wheel 14 as it rolls. By substantially parallel is meant within 5 degrees of being parallel to each other or to an imaginary plane running through the center of the wheel 14 which is perpendicular to the axis or axle of the wheel 14 shown as the bolt 30.

The use of side members 34 forming the body 12 in this fashion thereby locates the two opposing sides of the body 12 of the device 10 formed by the side member 34, and side portions of the flexible shield 16 extending from the side members 34, very close to both sides of the wheel 14. This is preferred because during experimentation using other shapes for the perimeter of the body 12, it was found that round perimeters caused the side portions of the flexible shield 16 to project too far from the sides of the wheel 14 where the body 12 and flexible shield 16 make contact with other objects and such during movement. By maintaining the side portions of the flexible shield 16 and the two side members 34 proximate to the wheel 14, such unwanted contact with surrounding objects and structures, when rolling the caster in tight spaces, was minimized. By proximate is meant that each side portion 34 is within three inches of an adjacent side surface of the wheel 14.

Figure 2:
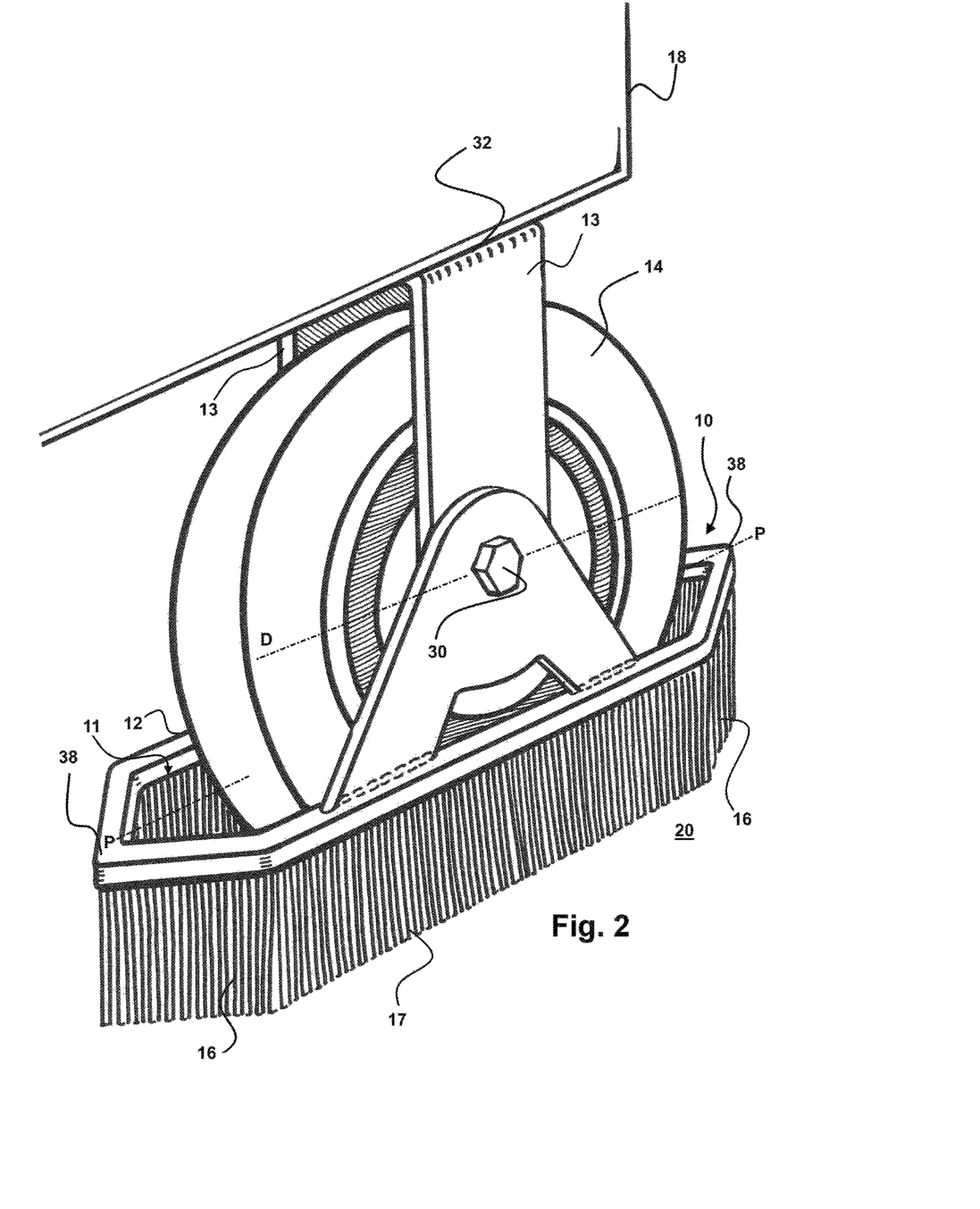
FIG. 2 shows the device of FIG. 1 in an as-used positioning showing the connector to the caster provided by distal ends of the mounting brackets engaged with the caster in a fashion which positions the intersection point of angled sides of front and rear sections of the body of the device in line with the path of the caster wheel.

Also preferred in all modes of the device 10, are angled projecting portions 36 of the body 12, which extend to a projecting point 38 configured to be positioned directly in front of and behind the wheel 14, when the device 10 is in the as used position of FIG. 2. Particularly preferred in all modes of the device 10 are such projecting portions 36 formed by a pair of angled portions 37 of the body 12, which extend from first ends of the angled portions 37 connected to respective ends of the side members 34, to respective second ends engaged at a intersecting or projection point 38.

Such a configuration preferably has lengths of the angled portions 37 which form the projected portions 36 which each have a respective projection point 38 aligned at respective opposite ends of the body 12 and positioned between the two side members 34. Such may be seen in FIG. 3, where the two projection points 38 of the body 12 are positioned at opposite ends of the body 12.

It is preferred in all modes of the device 10 that the connector engaging the body 12 and device 10, operatively to a caster, is configured to form that connection to operatively position the device 10 to the as-used position of FIG. 2, with both projection points 38 substantially aligned with the plane running through the center of the circumference of the wheel 14, such that the rolling pathway shown as line "P" in FIG. 2, aligns with and runs through both projection points 38. Such an operative engagement positions both projection points 38 substantially aligned with the wheel 14 and positions both pairs of angled portions 37 of each projection portion 36 angled relative to the plane of the wheel 14, and in front of the wheel 14 when rolling in either direction along the pathway "P".

Forming both angled portions 37, at both ends of the body 12 of substantially equal lengths, will align the projection points 38 with the plane of the wheel 14, when the side members 34 of the body 12 are of substantially equal length, and are substantially equally spaced from a respective adjacent side of the wheel 14. However, by substantially is meant that any of these lengths of side members 34 or angled portions 37 or spacing from the wheel, can vary by up to 20 percent, and while the position of the projection points 38 may be slightly out of line with the plane of the wheel 14, it will still position angled portions of the flexible shield 16 in front of and to the rear of the wheel 14 during rolling.

This is especially important as in experimentation it was found that a curved configuration of the flexible shield 16 in front of and to the rear of the wheel 14, was not as effective at clearing particulate and debris from the wheel 14 path during rolling. It was found that the linear shape of both angled section of the flexible shield 16 yielded a significant increase in a sweeping action of debris from the path of the wheel 14, especially when the wheel 14 was turned during travel. This turning of angled linear portions of the flexible shield 16 caused a sweeping of debris, which was not accomplished with an arched or curved configuration of the flexible shield 16 in front of the rolling wheel 14.

Additional utility to the device 10 is also provided by this formation of parallel sides 34 with projections portions 36 at opposite ends extending to projection points 38. Such allows for the perimeter size of the body 12 surrounding the opening 11, to have a smaller footprint. This is because the length of the side members 34 between the engagements with angled members, can be less than the diameter "D" of the wheel 14 as shown in FIG. 2. This, as noted, allows the perimeter of the body 12 to be formed closer to the surfaces of the wheel 14 and project less therefrom. This closer positioning as noted avoids contact of the body 12 and flexible shield 16 with other objects, debris and things positioned on the support surface 20 when rolling the wheels 14 in close quarters.

As noted, the formation of projections portions 36 at both ends is preferred which positions the angled portions 37 directly in front of the wheel 14 during travel in either direction along a rolling pathway "P". It was found during experimentation that forming the angled portions 37 to a length which form an angle between 20-100 degrees of each angled portion 37, relative to the plane running through the wheel 14 and its circumference, or relative to the axis running through the center of each side portion 34, works significantly better in removing debris and particulate positioned on the support surface 20 with the wheel rolling along the pathway "P".

Thus, opposing angled portions 37 of each of the projecting portions 36 of the body 12, are of a length between their connection to the side members 34, and the projection point 38, to form an angle relative to a line running between both projection points 38, or the plane running through and extending from the circumference of the wheel 14, which is between 20 to 100 degrees. This angle allows angled portions of the flexible shield 16 extending from the angled portions 37 of the body 12, to encounter particulate, small objects, and metal fragments and the like, in a fashion where the flexible shield 16 contacts such and more easily deflects it to positions adjacent the flexible shield 16 projecting from the side members 34.

This was not the case where the body 12 was formed rectangular, with no projecting portions 36 or even where the body was formed with projecting portions 36 shaped in a curve or arc which, as noted above, proved inferior. Thus, projecting portions 36 having angled portions 37 which also angle the projecting engaged flexible shield 16 portions connected thereto, have been found to provide significantly enhanced removal of debris from in front of the wheel 14 proceeding along the rolling pathway "P" in either direction. Such was true whether the flexible shield 16 is formed of bristles 17, polymeric material or metal, felt, leather, rubber, or other types of flexible or filament material.

As noted, the flexible shield 16 is formed of a flexible material engaged at first ends to the body 12 around the perimeter edge thereof and in the same shape as the perimeter edge of the body 12. Preferably, the connector for engaging the body 12 and device 10 to an as-used position with a caster wheel 14 as in FIG. 2, is a connector providing for adjustment of the distance of the distal ends of the flexible shield 16 from the contact support surface 20, to allow for translation of the distal ends of the flexible shield 16 toward and away from the support surface 20 or bottom edge of the wheel 14. Such will allow for translation toward the support surface 20 to a fixed mount to either pre-load the force of contact of the flexible shield 16 with the support surface 20 or to adjust the flexible shield 16 after wear has worn the distal ends of the flexible shield 16.

Currently, forming the aperture 28 as an elongated slot, allows the user to slide the body 12 toward and away from the support surface 20 to a desired position where after tightening of the bolt 30 will fix that chosen position. Subsequently, this position may be adjusted by loosening the bolt 30 and repositioning the elongated aperture 28 around it, and re-tightening the bolt 30. Of course other means to adjust the distance of the body 12 from the support surface may also be employed, however, currently the elongated slot forming the aperture 28 works well.

Figures 3, 3A:
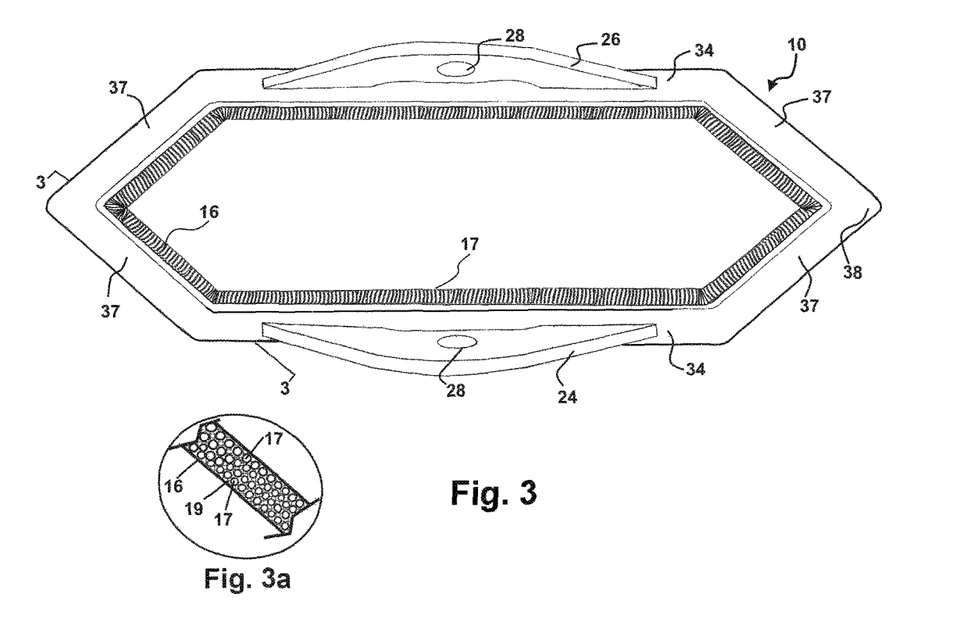
FIG. 3 shows a top plan view of the device of FIG. 1 showing the pair of mounting brackets extending from a first end connected to the body of the device, to distal ends which are adapted for engagement to a wheeled caster to position the center of the pointed front and rear sections aligned with the plane of the wheel.
FIG. 3a is a sectional view the bristles of FIG. 3, which shows a particularly preferred mode of formation of the flexible shield on at least the angled sides of the front and rear of the device where flexible adhesive such as silicone adhesive, is cured to join portions of the individual bristles forming this mode of flexible shield.
Figure 4:
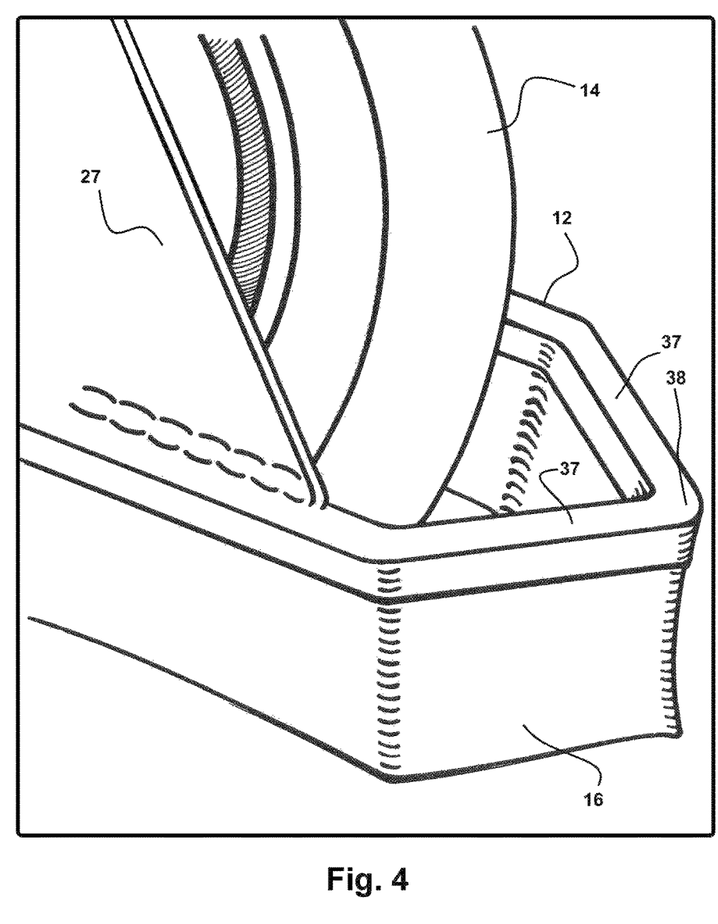
FIG. 4 shows an enlargement of the front or rear pointed section of the body of the device which holds the flexible shield formed of a flexible material such as leather, rubber or bristles, at an angle extending from an intersection point of angled portions directly in line with the caster wheel, to respective engagements to the ends of side sections of the body.
Figure 5:
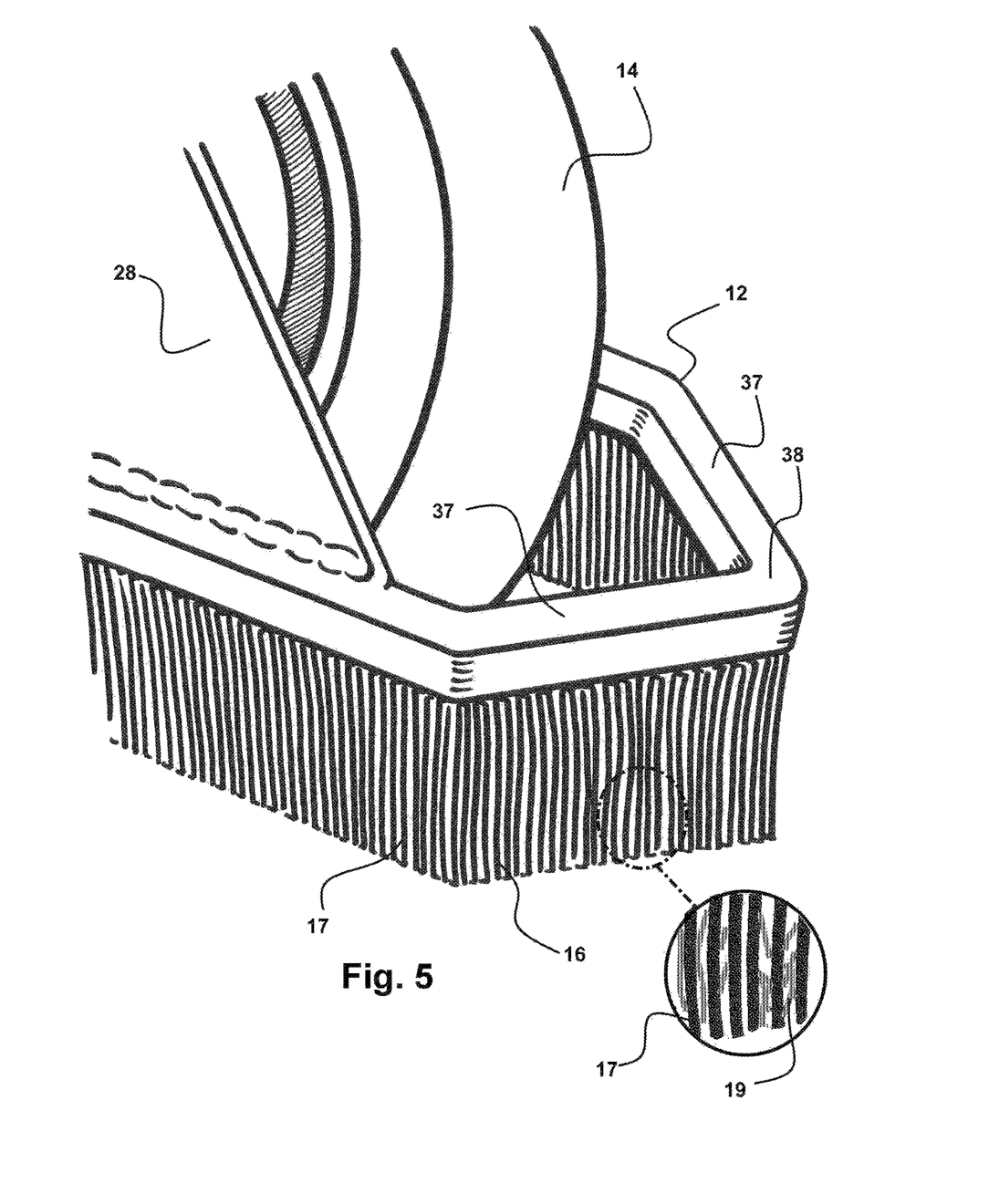
FIG. 5 shows perspective of the device as in FIG. 4, showing the flexible shield formed of replaceable bristles extending from an engagement at a first end with a slot in a bottom surface of the body of the device, to distal ends which contact the support surface for the wheel.
Figure 6:
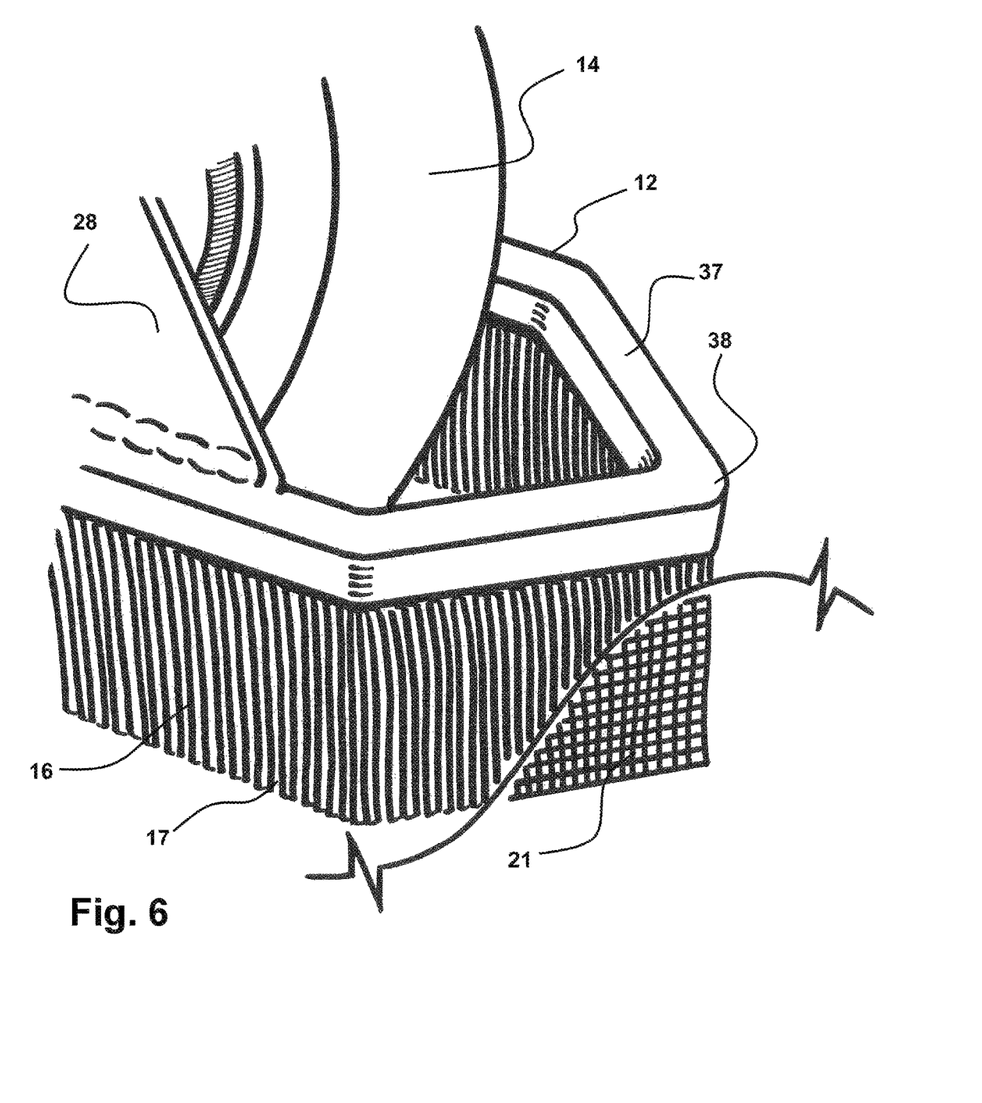
FIG. 6 depicts a view of a particularly preferred mode of the device herein wherein the individual bristles extending from engagements at first ends with the body to form the flexible shield have a flexible adhesive such as silicone adhesive connecting side surfaces of portions of adjacent respective bristles with each other, and optionally with a mesh reinforcement.

As noted, the flexible shield 16 as shown in various modes in FIGS. 2-6, is best formed of a flexible material such as one from a group of flexible shield materials including bristles 17 formed of metal or nylon or other polymeric material such as in FIGS. 3, 5, and 6, or leather, rubber or other flexible materials such as in FIG. 4. Currently preferred is a flexible shield formed of bristles 17 shown in FIGS. 1, 3, 5, and 6. The bristles 17 as noted, may be metal or may be plastic or nylon or other polymeric materials. Such bristles 17 were found to work particularly well with the angled portions 37 and projecting portions 36 such as in FIGS. 3-6. When encountering debris on the support surface, the bristles 17 in angled portions 37 were seen to better reinforce each other and hold their position than where a straight or arched front and rear were tried. It appears that the entire line of bristles 17 pushed against adjacent bristles 17 when encountering debris and better held the bristles 17 at the contact point in place.

In an unexpected result, depicted in FIG. 3a, it was found that reinforcing the bristles 17 forming the flexible shield 16, at least in areas where the bristles 17 extended from the angled portions 37, by adhering portions of adjacent bristles 17 together with an adhesive 19, such as silicone adhesive, yielded significant improvement in the ability of the flexible shield 16 extending from the angled portions 37, to reject and push debris to the sides and out of the way of the wheel 14. It was found that the bristles 17 forming the flexible shield 16 where adhered with portions of adjacent bristles 17, also wore better against abrasion with the support surface 20.

While logic dictated forming the flexible shield 16 from sheets of flexible rubber, plastic or leather should yield the same result. It unexpectedly did not. While a flexible shield formed of sheets of such material, using the projecting portions 36 worked better than a device 10 without such projecting portions 36, forming the flexible shield 16, at least where it extended from the projecting portions 36 of the body 12 from nylon or plastic, and then employing silicone adhesive 19 to adhere portions of adjacent bristles to each other significantly improved the ability of the flexible shield 16 to remove debris from the wheel pathway "P", and enhanced longevity. As such, in all modes of the device 10, the inclusion of projecting portions 36 formed by angled portions 37 is preferred. Further, forming the flexible shield 16 of bristles 17 or small filaments is also preferred, as such was shown to outperform other flexible shield materials. In areas of high wear or which have large amounts of debris on the support surface 20 the inclusion of silicone or other adhesive 19 to connect portions of adjacent bristles 17 of the flexible shield 16 to each other, would also be preferable.

Finally, in another preferred mode of the device 10 herein, the flexible shield 16, at least in areas thereof projecting from the angled portions 36 of the body 12, can be significantly enhanced against wear and to increase sweeping and rejection of larger or heavy particulate on the support surface 10 through the inclusion of both an adhesive 19 and a reinforcing mesh 21 (FIG. 6) adhered in-between the bristles 17 forming the flexible shield 16. In this mode a mesh 21 reinforcement fabric such as vinyl coated fiberglass insect screen sold by Phifer Mills, is interwoven in-between bristles 17 forming the flexible shield 16 extending from at least all angled portions 37 of the body 12.

As shown in FIG. 6, a planar sheet of the flexible mesh 21 is positioned between the bristles 17 in a central portion thereof in-between the exposed surfaces of the bristles 17 forming the flexible shield 16. The mesh 21 preferably runs the length of the bristles 17 or a portion thereof forming the flexible shield 16 extending from the angled portions 37.

When used in combination with an adhesive 19, the adhesive 19 is applied to both adhere areas of the mesh 21 to adjacent bristles 17, and to adhere portions of bristles 17 not adjacent the mesh 21, to each other. When employed for portions of the flexible shield 16 which extend from the angled portions 37 of the body 12 forming the projecting portions 36, the flexible shield 16 was significantly improved in the ability to resist wear to the distal ends of the bristles 17, and, to prevent larger or heavy debris on the support surface 20 from breaching the flexible shield 16 and reaching the wheel 14. As such, in venues of use having a highly abrasive support surface 20 or where the device 10 is anticipated to frequently contact heavier or larger debris, the inclusion of the mesh 21 along with adhesive 19 to adhere to portions of and reinforce the bristles 17 is preferable. However, in all modes of the device 10, the sweeping ability of the device, is significantly improved with either inclusion individually of the adhesive 19, which will connect adjacent portions of bristles 17 in-between their respective first ends and distal ends, or a planar piece of mesh 21 positioned in-between rows of bristles 17.

Figure 7:
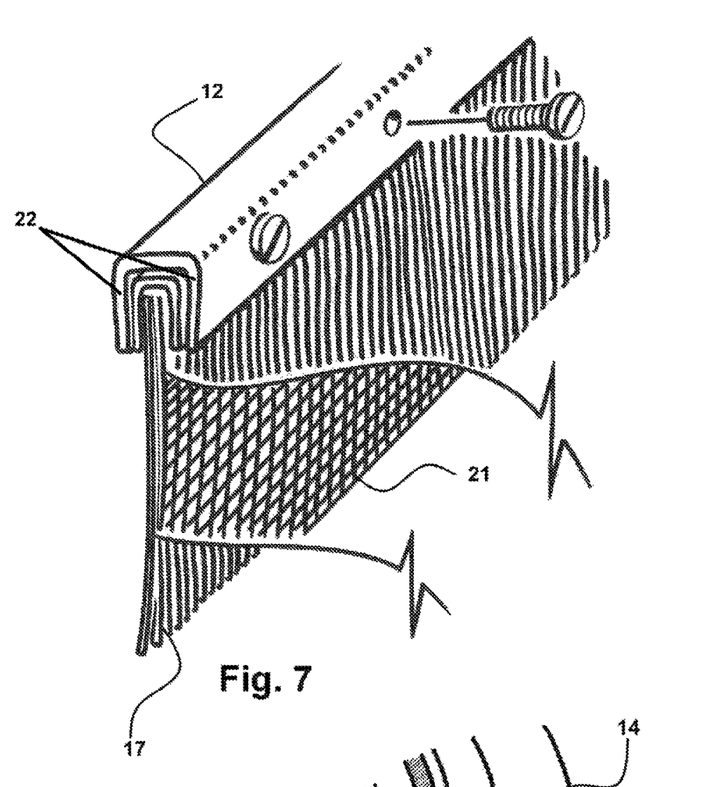
FIG. 7, shows a perspective sectional view of the flexible shield showing a replaceable mode where the flexible shield removably engages the body of the device with a fastener such as a screw and showing the mesh interposed in-between the bristles forming the flexible shield.

FIG. 7, depicts a perspective sectional view of the flexible shield 16 shown in the replaceable configuration where a new shield 16 may be engaged with the body 12 as required. In this mode the flexible shield 16 engages the body 12 of the device 10 with a fastener which may be adhesive or a frictional engagement in the U-shaped member of the body 12, or for example the fastener could be screws, as shown, or clips, or other fasteners adapted to the task. Also shown is the layer of mesh 21 interposed between the bristles 17 forming the shield.

Figure 8:
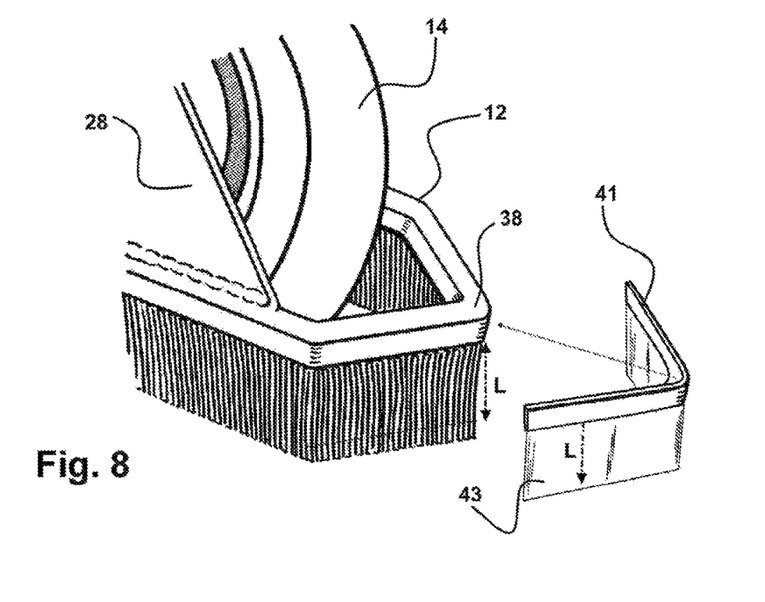

Finally, in FIG. 8 is depicted an optional guard 41 which is engageable to the cover the flexible shield 16 around the projection point 38 and extending in front of the flexible shield 16 along both angled portions 37. The guard has a rigid shield 43 which extends a distance "L" below the edge of the body 12. The distance "D" is preferably a length which leaves a portion of the flexible shield 16 exposed which is between ½ inch to 1 inch in length. This allows the flexible shield 16 to function normally to sweep aside small particulate and the like, but prevents the toe of a worker or user from getting past the rigid shield 43 where it might get under a rolling wheel 14. The guard 41 would be engageable with a fastener from a group of fasteners including screws, clips, magnets, adhesive, or other fasteners as would occur to those skilled in the art.

It should be noted and anticipated that although the protective flexible shield device for prevention of debris contact with caster wheels herein is shown in its most simple form, various components and aspects of the device may be differently shaped or slightly modified when forming the invention herein. As such, those skilled in the art will appreciate that the descriptions and depictions set forth in this disclosure are merely meant to portray examples of preferred modes within the overall scope and intent of the invention, and are not to be considered limiting in any manner.

Further, while all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. A debris shield for a caster wheel, comprising:
a body having a perimeter edge defining a shape of said body surrounding an opening communicating through an interior of said body;
a connector having a first end engaged with said body and extending to a second end of said connector;
said second end of said connector configured to engage with a caster assembly to an operative engagement of said body therewith positioning a wheel of said caster assembly extending through said opening of said body;
said perimeter edge of said body having two substantially parallel sides positioned between a first end and a second end of said body;
a first pair of angled projecting portions of the body extending from first ends connected to said sides of said body at said first end of said body, and intersecting at second ends of said first projecting portions at a first projecting point;
a second pair of angled projecting portions of the body extending from first ends connected to said sides of said body at said second end of said body, and intersecting at second ends of said second projecting portions at a second projecting point;
a flexible shield having a first end in an engagement with said body;
said flexible shield extending around said perimeter edge of said body, a shield length extending from said first end to a distal end of said flexible shield;
a portion of said flexible shield extending from said first pair of angled portions forming a first pair of angled portions of said flexible shield;
a portion of said flexible shield extending from said second pair of angled portions forming a second pair of angled portions of said flexible shield; and
said distal end of said flexible shield forming a debris shield shaped complimentary to said perimeter edge of said body, said debris shield surrounding said wheel while rolling on a support surface to clear debris from a path of said wheel rolling on said support surface.

2. The debris shield for a caster wheel of claim 1 additionally comprising:
said flexible shield formed of a plurality of bristles.

3. The debris shield for a caster wheel of claim 2 additionally comprising:
flexible adhesive connected between portions of said plurality of bristles forming said first pair of angled portions of said debris shield; and
flexible adhesive connected between portions of said plurality of bristles forming said second pair of angled portions of said debris shield.

4. The debris shield for a caster wheel of claim 3 additionally comprising:
said engagement of said flexible shield having at said first end thereof with said body, being a removable engagement with said body.

5. The debris shield for a caster wheel of claim 4 additionally comprising:
said removable engagement of said first end with said body, being a recess depending into said body around said perimeter thereof, said recess sized for engagement of said first end of said flexible shield therein.

6. The debris shield for a caster wheel of claim 3 additionally comprising:
flexible mesh material interlaced within said plurality of bristles forming said first pair of angled portions of said debris shield; and
flexible mesh material interlaced within said plurality of bristles forming said second pair of angled portions of said debris shield.

7. The debris shield for a caster wheel of claim 2 additionally comprising:
said engagement of said flexible shield having at said first end thereof with said body, being a removable engagement with said body.

8. The debris shield for a caster wheel of claim 7 additionally comprising:
said removable engagement of said first end with said body, being a recess depending into said body around said perimeter thereof, said recess sized for engagement of said first end of said flexible shield therein.

9. The debris shield for a caster wheel of claim 1 additionally comprising:
said engagement of said flexible shield having at said first end thereof with said body, being a removable engagement with said body.

10. The debris shield for a caster wheel of claim 1 additionally comprising:
a guard having a first end engageable to said body to an engaged position,
said guard having a rigid shield extending a guard length from a first side engaged with said body to a distal end of said shield; and
said guard length sized between ½ inch to 1 inch shorter than said shield length.

11. A debris shield for a caster wheel, comprising:
a body having a first end, a second end, and a perimeter edge defining a shape of said body surrounding an opening communicating through an interior of said body;
a connector having a first end engaged with said body and extending to a second end of said connector;
said second end of said connector configured to engage with a caster assembly to an operative engagement of said body therewith positioning a wheel of said caster assembly extending through said opening of said body;

a flexible shield having a first end in an engagement with said body;

said flexible shield extending around said perimeter edge of said body, a shield length extending from said first end to a distal end of said flexible shield;

said flexible shield formed of a plurality of bristles;

flexible adhesive connected between portions of said plurality of bristles; and said distal end of said flexible shield forming a debris shield shaped complimentary to said perimeter edge of said body, said debris shield surrounding said wheel while rolling on a support surface to clear debris from a path of said wheel rolling on said support surface.

12. The debris shield for a caster wheel of claim 11 additionally comprising:

said engagement of said flexible shield having at said first end thereof with said body, being a removable engagement with said body.

13. The debris shield for a caster wheel of claim 12 additionally comprising:

said removable engagement of said first end with said body, being a recess depending into said body around said perimeter thereof, said recess sized for engagement of said first end of said flexible shield therein.

14. The debris shield for a caster wheel of claim 12 additionally comprising:

flexible mesh material interlaced within said plurality of bristles.

15. The debris shield for a caster wheel of claim 11 additionally comprising:

said engagement of said first end with said body, being a recess depending into said body around said perimeter thereof, said recess sized for engagement of said first end of said flexible shield therein.

* * * * *